United States Patent
Niederdränk

(10) Patent No.: US 8,422,710 B2
(45) Date of Patent: Apr. 16, 2013

(54) METHOD FOR DESIGNING AND MANUFACTURING A HEARING AID DEVICE WITH AN ANTENNA

(75) Inventor: Torsten Niederdränk, Singapore (SG)

(73) Assignee: Siemens Audiologische Technik GmbH, Erlangen (DE)

( * ) Notice: Subject to any disclaimer, the term of this patent is extended or adjusted under 35 U.S.C. 154(b) by 135 days.

(21) Appl. No.: 13/029,916

(22) Filed: Feb. 17, 2011

(65) Prior Publication Data

US 2011/0142270 A1 Jun. 16, 2011

Related U.S. Application Data

(62) Division of application No. 11/527,885, filed on Sep. 27, 2005, now Pat. No. 7,933,425.

(30) Foreign Application Priority Data

Sep. 27, 2005 (DE) .......................... 10 2005 046 169

(51) Int. Cl.
*H04R 25/00* (2006.01)
*G06F 17/50* (2006.01)

(52) U.S. Cl.
USPC .............................................. 381/322; 703/1

(58) Field of Classification Search ................ 700/98, 700/118; 703/1; 381/60, 312, 322, 324, 381/328, 331

See application file for complete search history.

(56) References Cited

U.S. PATENT DOCUMENTS

| | | | |
|---|---|---|---|
| 3,363,255 A | | 1/1968 | Nicnaber |
| 3,598,928 A | | 8/1971 | Hickox |
| 4,912,769 A | | 3/1990 | Erbe |
| 5,487,012 A | * | 1/1996 | Topholm et al. .............. 700/118 |
| 5,734,976 A | | 3/1998 | Bartschi et al. |
| 5,889,874 A | | 3/1999 | Schmitt et al. |
| 6,205,227 B1 | * | 3/2001 | Mahoney et al. ............. 381/328 |
| 6,768,802 B1 | | 7/2004 | Baechler |
| 7,407,035 B2 | | 8/2008 | Stinauer et al. |
| 7,742,614 B2 | | 6/2010 | Christensen et al. |
| 2002/0191806 A1 | * | 12/2002 | Rohrseitz et al. ............. 381/312 |
| 2004/0196996 A1 | | 10/2004 | Feitel |
| 2004/0264723 A1 | | 12/2004 | Saltykov |
| 2005/0068250 A1 | | 3/2005 | Cornec et al. |
| 2005/0074138 A1 | | 4/2005 | Saltykov |
| 2005/0168396 A1 | | 8/2005 | Victorian et al. |
| 2005/0232454 A1 | | 10/2005 | Niederdrank et al. |
| 2005/0238190 A1 | | 10/2005 | Rohrlein |
| 2005/0244024 A1 | | 11/2005 | Fischer et al. |

FOREIGN PATENT DOCUMENTS

DE 201 14 461 U1 12/2001

\* cited by examiner

*Primary Examiner* — Brian Ensey
(74) *Attorney, Agent, or Firm* — Schiff Hardin LLP

(57) ABSTRACT

The production of a hearing aid device suitable for wireless signal transmission is simplified by providing fastening elements connected as one piece with the housing shell. The fastening elements serve for placement and fastening of an antenna or coil in the housing shell of the appertaining hearing aid device. The production of a hearing aid device with a corresponding antenna or coil is thereby simplified. The alignment of the antenna or coil in the housing shell can also already be optimized using a computer model of the housing shell.

1 Claim, 2 Drawing Sheets

METHOD FOR DESIGNING AND MANUFACTURING A HEARING AID DEVICE WITH AN ANTENNA

RELATED APPLICATION

The present application is a divisional of U.S. patent application Ser. No. 11/527,885, filed on Sep. 27, 2006, issued as U.S. Pat. No. 7,933,425 on Apr. 26, 2011.

BACKGROUND OF THE INVENTION

1. Field of the Invention

The present invention concerns a method for production of a housing shell for a hearing aid device as well as a hearing aid device of the type having a housing shell, an input transducer for acquisition of an input signal and transducing it into an electrical input signal, a signal processing unit for processing the electrical input signal, an output transducer for transducing the processed electrical input signal into an output signal that can be perceived by a user as an acoustic signal, and an antenna or coil for wireless signal transmission between the hearing aid device and a further apparatus.

2. Description of the Prior Art

Modern hearing aid devices frequently offer the possibility of wireless signal transmission between the hearing aid device and a further apparatus, for example a further hearing aid device, a communication apparatus or a remote control. Such hearing aid devices have an antenna or coil for wireless transmission and reception of data.

The housing of a hearing aid device that can be worn in the ear (ItE) frequently has an individually-shaped housing shell and a prefabricated faceplate. For simplification of the manufacturer process, hearing aid device components (such as sound transducers, components for signal processing and a battery for voltage supply) are arranged on the faceplate as far as possible. The antenna or coil required for wireless transmission or reception also can be arranged on the faceplate during the manufacturing process, but this increases the space requirement for arrangement of components on the faceplate. It is also difficult to individually align the antenna or, respectively, coil arranged on the faceplate. Moreover, the available space in the auditory canal is frequently not optimally utilized, depending on the individual anatomy of the auditory canal.

In the manufacture of hearing aid devices, methods are known, for production of housing shells in which data about the individual auditory canal of a hearing device user are initially acquired. A computer model of the housing shell of a hearing aid device to be produced is generated from the data in a CAD process. In addition to the individual housing shell, the remaining components of the hearing aid device (sound transducer, signal processors, battery etc.) are also generated as virtual computer models. The hearing aid device thus can already be generated using the computer model before the actual production. Using the computer model it can be clarified whether the desired components fit in the individual housing shell. If necessary, the design of the housing shell can be adapted or other components can be selected. For production of the housing shell, the data so acquired are finally supplied to a machine that generates an individual housing shell from the computer model. Such machines are well known from the field of rapid prototyping. The production can ensue according to different methods, of which the SLS method (selective laser sintering), the SLA method (stereo lithography) or the DLP method (digital light processing) are customary for production of housing shells of hearing aid devices. For a hearing aid device wearable in the ear, a subsequently-produced individual housing shell is normally combined with an industrially prefabricated faceplate that already carries a majority of the electronic hearing aid device components.

A method for production of an individual housing shell for a hearing aid device, wherein the housing shell is adapted to the contours of an auditory canal of a user, is known from EP 0 516 808 E1. The method is based on process steps that are known from the field of rapid prototyping.

A mount for attachment of an earpiece in a hearing aid device is known from United States Patent Application Publication No. 2005/0074138. The mount has components fashioned in one piece with the housing shell, the components being produced simultaneously with the housing.

A hearing device in which an antenna is fashioned in the material of the housing or as an electrically-conductive layer on the hearing device housing is known from DE 102004017832 B3. The housing is used as a carrier material for the antenna and the space for the antenna (that would otherwise be provided on the circuit board, for example) can be foregone.

A hearing device with an antenna that is integrated into the housing of the hearing device is known from DE 10115896 A1.

The attachment of an antenna or coil for wireless signal transmission on a prefabricated faceplate is problematic because the mounting system must be altered due to this additional component and because of the space requirement additionally required for this. Moreover, the usage capability of the faceplate is severely limited.

SUMMARY OF THE INVENTION

An object of the present invention is to improve the attachment of an antenna or coil for wireless signal transmission in the housing of a hearing aid device.

In a hearing aid device, an input signal is acquired and converted into an electrical input signal by an input transducer. At least one microphone which acquires an acoustic input signal typically serves as an input transducer. Modern hearing aid devices frequently have a microphone system with a number of microphones in order to achieve reception dependent on the incident direction of acoustic signals (a directional characteristic). The input transducer can also be a telephone coil or an antenna for acquisition of electromagnetic input signals. The input signals transduced by the input transducer into electrical input signals are supplied to a signal processing unit for further processing and amplification. For compensation of the individual hearing loss of a hearing device user, the further processing and amplification normally ensue dependent on the signal frequency. The signal processing unit generates an electrical output signal that is supplied to the ear of the hearing device user via an output transducer so that the user perceives the output signal as an acoustic signal. Earpieces that generate an acoustic output signal are typically used as output transducers. Output transducers for generation of mechanical oscillations are also known that directly excite specific parts of the ear (such as, for example, the ossicle) to oscillations. Furthermore, output transducers are known that directly stimulate nerve cells of the ear.

The invention can advantageously be applied in computer-controlled manufacturing methods for manufacturing of hearing aid devices and in particular for production of hearing aid devices wearable in the ear (ItE) in which a housing shell to be produced initially exists in the form of computer data. A virtual placement of electronic components in the housing shell subsequently ensues in a computer-aided manner. Both the placement of individual components and the shaping of the housing shell can be optimized by means of computer-aided optimization processes. This optimization can be implemented manually by operation of a user interface with the aid of a computer or ensue in a fully-automated process or even ensue in a mixed form in which both an optimization via an algorithm aromatically running on a computer and via manual cooperation of the person operating the computer.

According to the invention, in addition to other hearing aid device components (faceplate, receiver etc.) the antenna is already taken into account in the design of the hearing aid device by the CAD system. The placement of the antenna or coil is thereby automatically optimized by software or in connection with manual user inputs. If a suitable position for the antenna or coil is found, virtual elements for placement and/or attachment of the antenna or coil in the housing shell are automatically initially generated. These elements are formations connected as one piece with the housing shell, by means of which formations the antenna or coil can be placed and attached in the housing with an established alignment (orientation). These formations are then physically generated during the manufacture of the housing shell.

The invention offers the advantage that the antenna or coil is taken into account by the CAD system during the computer-aided design of the appertaining hearing aid device. The antenna or coil is directly placed in the housing shell, and the faceplate therefore does not have to be expanded by an antenna or coil, such that no increased space requirement arises on the faceplate due to the antenna or coil. Normally free space present in the housing shell anyway can be used for the arrangement of the antenna or coil. An enlargement of the housing shell to accommodate the antenna or coil is therefore necessary only in rare cases The receptacles generated in the housing shell by the invention for placement and/or attachment of the antenna or coil also enable a fast mounting of the antenna or coil in the produced housing shell. The production costs of the appertaining hearing aid device thus can be decreased. Moreover, the computer-aided placement of the antenna or coil in the housing shell offers not only an optimization of the space requirement but also an optimization with regard to its function. Depending on transmission purpose for which the antenna is primarily provided, in addition to the position the alignment can also be optimized. For example, for a binaural hearing aid device system in the left ear and a hearing aid device worn in the right ear, the employed antennas or coils can be aligned such that the signal transmission between the two hearing aid devices is optimized. This can ensue, for example, by antennas of two hearing aid devices worn in the ears of a user being aligned relative to one another such that an optimized signal transmission ensues. The necessary transmission power is thereby decreased, or the reception is thereby improved.

The invention enables the use of an antenna or coil for wireless signal transmission in connection with a hearing aid device, even given a very small device configuration (for example a CIC (completely-in-canal) hearing aid device).

DESCRIPTION OF THE PREFERRED EMBODIMENTS

Figure 1:
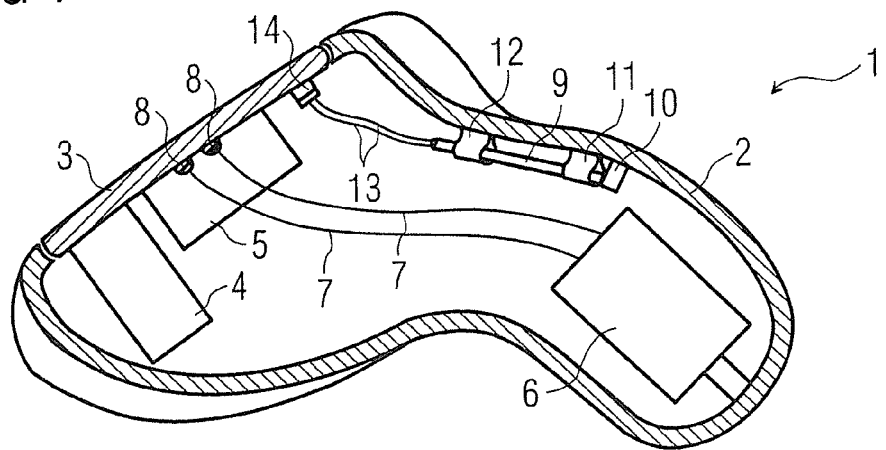
FIG. 1 is a schematic section through a hearing aid device according to the invention with fastening elements formed on the housing shell for an antenna.

FIG. 1 shows a hearing aid device 1 that can be worn in the ear with an individually fabricated housing shell 2. Such housing shells are frequently produced according to production methods that are known from the field of rapid prototyping. Data with regard to the auditory canal of a user are thereby initially acquired and stored in a computer. A computer model of the housing is ultimately calculated from these data. The model is thereby adapted such that the outer contours exactly match the contours of the individual auditory canal and all electronic components provided for the hearing aid device find space in the housing shell. Data about the housing shell developed on the computer are ultimately transferred to a production machine that generates the desired housing shell from the computer data. Prevalent production methods are, for example, the SLS method (selective laser sintering) and the SLA method (stereo lithography).

To complete the appertaining hearing aid device, an earpiece 6 is introduced into the finished housing shell 2 (for example glued in) and the housing is, for example, closed with an industrially prefabricated faceplate. Electronic components (such as a microphone 4, a semiconductor component 5 (for example signal processor) and a battery bay (not shown)) are already located on the faceplate. In the exemplary embodiment, cables 7 as well as solder connections 8 are provided for electrically contacting the earpiece 6 with the electronic components of the faceplate 3. Upon assembly of the hearing aid device 1, the earpiece 6 is initially introduced into the housing shell 2; the solder connections 8 are subsequently produced and after this the faceplate 3 is connected [for example clipped] to the housing shell 2.

In the hearing aid device according to the invention, a transmission and reception antenna 9 is provided for wireless signal transmission between the hearing aid device 1 and a further apparatus, for example a second hearing aid device of the same design for binaural feed of a user. In known in-the-ear hearing aid devices, such an antenna would either already be provided on the faceplate or (similar to as in the earpiece 6) be attached (for example adhered) in the shell before the assembly of the hearing aid device.

If the antenna is already provided on the faceplate, this has the disadvantage that in principle more space must be provided for the faceplate. This competes with the desire for miniaturization of the faceplate and of the entire hearing aid device to the greatest possible extent. The introduction of an antenna in the housing shell before the assembly of the appertaining hearing aid device can also cause problems since a suitable space in the housing shell must first be found. Under the circumstances, a collision of the antenna with components arranged on the faceplate can occur in the assembly of the hearing aid device.

According to the invention, the antenna 9 is already taken into account in the design of the housing shell 2 on the computer, thus in the computer model. Since all further electronic components of the hearing aid device 1 are also advantageously taken into account in the computer model, a suitable space for the antenna 9 can already be determined before the assembly, such that no collision of the antenna 9 with other components ensues. In order to also find this space found in the computer model for the antenna 9 later in the assembly of the real hearing aid device, fastening elements for attachment of the antenna 9 are initially virtually provided on the housing shell 2 in the computer model and later also provided in the real housing shell 2. This has the advantage that a suitable space for the attachment of the antenna 9 can be recognized immediately upon assembly of the hearing aid device 1 using the fastening means integrated into the housing shell 2. The person who assembles the hearing aid device therefore does not first have to search for a long time for a suitable space.

The invention furthermore offers the advantage that a specific alignment in the housing shell 2 is already provided by the attachment means. This alignment is already established in the computer model of the hearing aid device 1. A specific alignment of the antenna with regard to the auditory canal of the individual user of the hearing aid device 1 is thereby also established. The antenna is aligned in the housing shell 2 or the auditory canal of a user such that an optimized signal transmission is enabled between the hearing aid device and a hearing aid device of identical construction in the second auditory canal of the user. For example, both antennas of the hearing aid devices are aligned along a straight line or parallel relative to one another.

In the framework of the invention a number of alternatives are possible with regard to the physical design of the attachment elements. Two of these alternatives are subsequently described:

In the exemplary embodiment according to FIG. 1, catch flanges 11 and 12 into which the antenna 9 can be pushed for fastening are shaped on the housing shell. The antenna 9 is thus fastened and aligned according to a type of snap fit or latch in the housing shell 2. In order to achieve an exact positioning with regard to all spatial directions, a stop 10 is also formed on the housing shell 2. According to the invention this is also fashioned in one piece with the housing shell 2. In the assembly [mounting] the antenna 9 is then pushed into the receptacles 11 and 12 such that the rear end of the antenna 9 abuts on the stop 10. The antenna is thereby fastened and positioned exactly. Conductors 13 as well as a plug connection 14 are provided for electrical contacting of the antenna 9 with the faceplate 3. The plug connection 14 enables a solder-free connection of the antenna 9 with the faceplate 3. Alternatively, a solder connection can be provided as is shown in connection with the earpiece 6 and the solder connections 8 in the exemplary embodiment.

Figure 2:
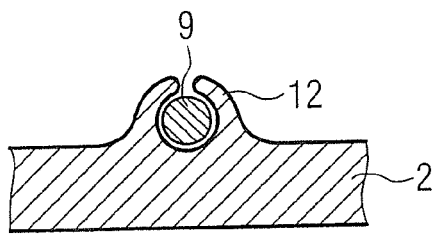
FIG. 2 shows a snap (catch) connection for the antenna.

FIG. 2 shows a fastening element 12 of FIG. 1 in a sectional view. The fastening element 12 has two flange-shaped formations of the housing shell 2, the thickness of which is dimensioned so that a specific resilience is achieved. The flange-shaped appendages are elastic insofar as that the antenna 9 can be pushed into both flange-shaped formations, whereby it is then fastened and fixed by the appendages such that it is retained in position within the housing shell even given strong vibrations of the housing shell 2. The antenna could also be removed from the mount with a suitable tool (for example in the case of repair) without thereby destroying the mount 12 or the antenna 9.

Figure 3:
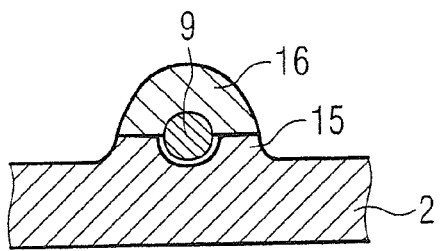
FIG. 3 shows an adhesive connection for the antenna.

FIG. 3 shows a different type of the attachment of the antenna 9 in a hearing aid device according to the invention. In contrast to the flange-shaped appendages according to FIG. 2, the fastening element 15 is fashioned as a shell-shaped elevation of the housing shell. Upon assembly of the appertaining hearing aid device, the space provided for the antenna can be immediately detected by looking into the housing shell. The antenna 9 is then placed into the shell and subsequently fastened and fixed with a suitable adhesive 16. The shell-shaped fastening element 15 can extend along a significant length of the antenna 9 or may present only at one or more short segments along the antenna 9, similar to the two fastening points in the forward region and rear region of the antenna 9 of FIG. 1.

The invention can particularly advantageously be applied for the production of hearing aid devices that can be worn in the ear, but it is not limited to this particular housing design. For example, a housing shell of a hearing aid device wearable behind the ear can also be manufactured in according to the same principle.

Figure 4:
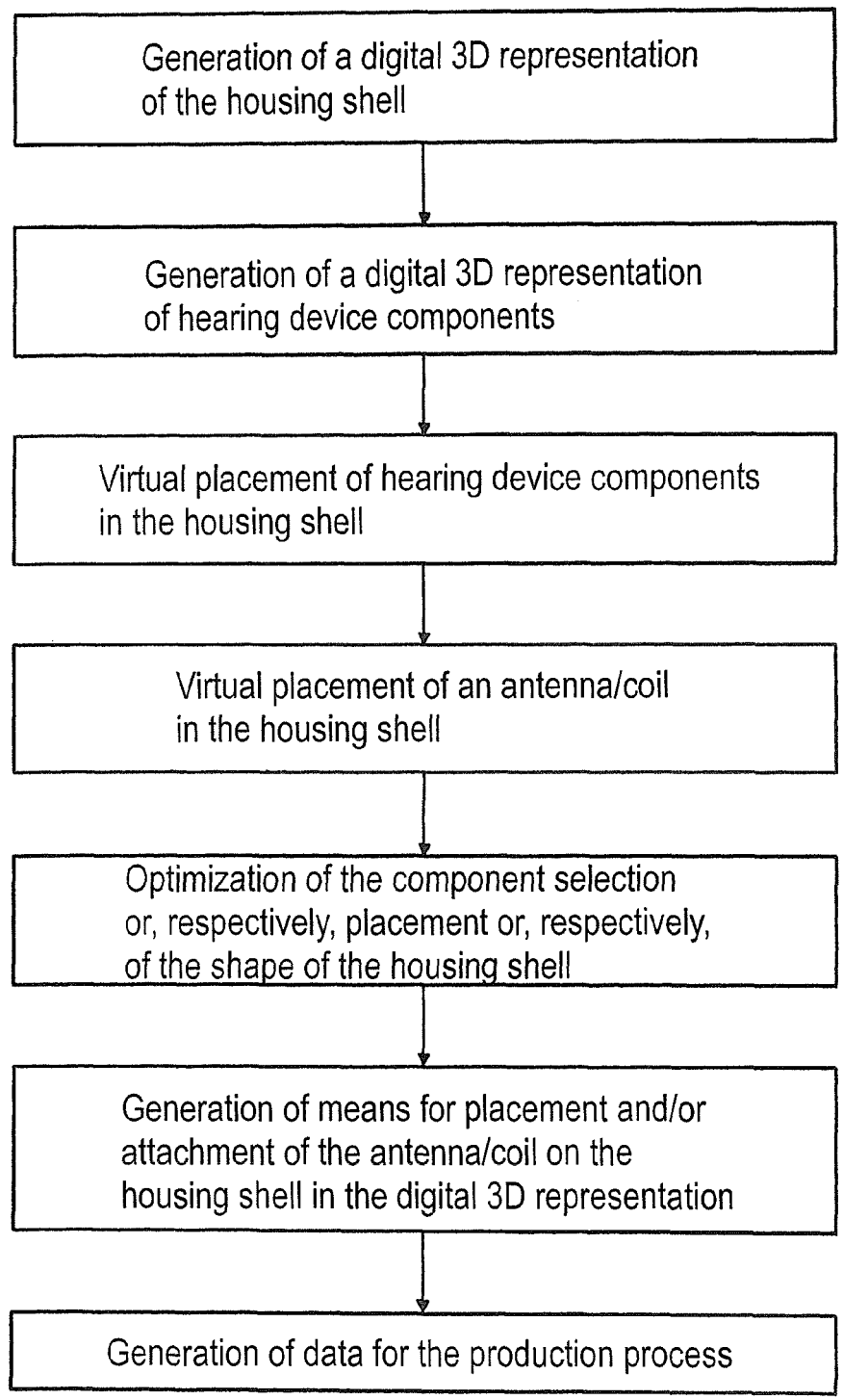
FIG. 4 is a flowchart for the manufacture of fastening elements for an antenna or coil in a housing shell.

The flowchart according to FIG. 4 shows an overview of the design and the production of a housing shell according to the invention. The design process begins with the generation of a digital 3-D representation of the housing shell that is calculated from computer data with regard to the auditory canal of a user. In addition to the data with regard to the auditory canal, data also exist with regard to the outer shape and size of the electrical components that should be used for the hearing aid device. A digital 3-D representation of the hearing aid device components is thus also present in the employed computer. It is thereby possible to implement a virtual placement of the provided hearing aid device components in the virtual housing shell in a next processing step. A suitable space for the antenna or, respectively, coil in the housing shell can likewise also be determined by means of the computer. An optimization can subsequently ensue in a further processing step. An optimization can thereby ensue given the selection of the electronic components used, such that a desired housing structural shape (for example CIC) of the hearing aid device to be produced is achieved in an optimally cost-effective manner. The placement of the selected components or also the shape of the housing shell can also be adapted and optimized to satisfy specified external boundary conditions. If, according to the invention, a suitable space and a suitable alignment for the antenna or coil are found, elements for placement and/or attachment of the antenna or, respectively, coil on the housing shell are initially generated in the digital 3-D representation of the hearing aid device. These elements can establish the space at which the antenna or coil should be attached in the housing shell, with the actual fastening ensuing in the production of the hearing aid device, for example by the application of an adhesive. Alternatively, fastening elements fashioned in one piece with the housing shell can be generated, such that a catch or snap connection for the antenna or coil arises, such that further fastening means (for example adhesive) are not necessary. In addition to the data with regard to the housing shell to be produced, data with regard to the elements for placement and/or fastening of the antenna or, respectively, coil are also then generated and forwarded to the fabrication machine. A housing shell produced with this data then already exhibits the corresponding fastening elements for the antenna or coil at the end of the production process.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for manufacturing a housing shell for a first hearing aid device in a Binaural hearing aid system that comprises said first hearing aid device and a second hearing aid device, said first hearing aid device containing a resonator that participates in signal transmission between said first hearing aid device and said second hearing aid device, said method comprising:

manufacturing a housing shell in an automated shell manufacturing procedure;

in said automated shell manufacturing procedure, integrally generating formations, configured to receive and hold said resonator, in an interior of said housing shell in one piece with said housing shell;

in said automated shell manufacturing procedure, generating a computer model of said housing shell;

in said automated shell manufacturing procedure, using said computer model of said housing shell to optimize, in a computer, a placement characteristic, selected from the group consisting of a position and an alignment, of said resonator in said housing shell that optimizes said signal transmission between said first hearing aid device and said second hearing aid device; and in said automated shell manufacturing procedure, generating said formations at respective locations in said interior of said housing shell conforming to said optimized placement characteristic.

\* \* \* \* \*